US012250639B2

(12) United States Patent
Lin

(10) Patent No.: US 12,250,639 B2
(45) Date of Patent: Mar. 11, 2025

(54) CAPABILITY PARAMETER DETERMINING METHOD, UPLINK SCHEDULING METHOD, TERMINAL, AND NETWORK-SIDE DEVICE

(71) Applicant: VIVO MOBILE COMMUNICATION CO., LTD., Guangdong (CN)

(72) Inventor: Hui Lin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 354 days.

(21) Appl. No.: 17/705,109

(22) Filed: Mar. 25, 2022

(65) Prior Publication Data

US 2022/0217648 A1 Jul. 7, 2022

Related U.S. Application Data

(63) Continuation of application No. PCT/CN2020/118071, filed on Sep. 27, 2020.

(30) Foreign Application Priority Data

Sep. 27, 2019 (CN) ........................ 201910926893.5

(51) Int. Cl.
*H04W 52/14* (2009.01)
*H04L 5/14* (2006.01)
(Continued)

(52) U.S. Cl.
CPC ............. *H04W 52/146* (2013.01); *H04L 5/14* (2013.01); *H04W 52/367* (2013.01); *H04W 72/1263* (2013.01); *H04W 76/15* (2018.02)

(58) Field of Classification Search
CPC ..... H04W 76/22; H04W 36/12; H04W 36/38; H04W 76/10; H04W 76/11; H04W 36/00;
(Continued)

(56) References Cited

U.S. PATENT DOCUMENTS

2012/0002578 A1* 1/2012 Ji .......................... H04L 1/1854 370/281
2016/0066276 A1* 3/2016 Su ......................... H04W 72/02 370/252
(Continued)

FOREIGN PATENT DOCUMENTS

CN 104486050 A 4/2015
CN 108604949 A 9/2018
(Continued)

OTHER PUBLICATIONS

Partial Supplemental European Search Report for Application No. 20868702.0-1206, dated Oct. 19, 2022, 20 Pages.
(Continued)

*Primary Examiner* — Nathan S Taylor
(74) *Attorney, Agent, or Firm* — BROOKS KUSHMAN P.C.

(57) ABSTRACT

The present invention provides a capability parameter determining method, an uplink scheduling method, a terminal, and a network-side device, where a connection link of the terminal includes an FDD link. The capability parameter determining method includes: determining, based on a first maximum transmit power and a first maximum uplink duty cycle, a second maximum uplink duty cycle of the terminal at a second maximum transmit power, where the first maximum transmit power and the first maximum uplink duty cycle both are capability parameters of the terminal on the first link, and the first maximum uplink duty cycle is a predefined capability parameter; and the second maximum transmit power and the second maximum uplink duty cycle both are capability parameters of the terminal on the second link.

20 Claims, 4 Drawing Sheets

(51) Int. Cl.
*H04W 52/36* (2009.01)
*H04W 72/1263* (2023.01)
*H04W 76/15* (2018.01)

(58) Field of Classification Search
CPC ........... H04W 36/0011; H04W 52/146; H04W 52/246; H04W 52/267; H04W 52/346; H04W 52/367; H04W 72/1263; H04W 76/15; H04W 8/22; H04W 8/24; H04W 88/02; H04W 72/1268; H04W 52/14; H04W 52/36; H04W 72/12; H04W 16/32; H04W 52/24; H04W 52/26; H04W 52/30; H04W 52/34; H04W 72/04; H04W 72/51; H04L 5/001; H04L 5/0028; H04L 5/0032; H04L 5/0058; H04L 5/0082; H04L 5/0092; H04L 5/14; H04L 5/1438; H04L 5/1469; H04L 5/00
See application file for complete search history.

(56) References Cited

U.S. PATENT DOCUMENTS

| | | | | |
|---|---|---|---|---|
| 2016/0081020 | A1* | 3/2016 | Rahman | H04W 24/10 370/311 |
| 2017/0230780 | A1* | 8/2017 | Chincholi | H04L 1/0036 |
| 2019/0166560 | A1* | 5/2019 | Su | H04W 52/0251 |
| 2019/0281504 | A1* | 9/2019 | Su | H04W 76/28 |
| 2019/0281598 | A1* | 9/2019 | Almalfouh | H04W 28/18 |
| 2020/0314764 | A1* | 10/2020 | Noh | H04W 52/146 |
| 2020/0314765 | A1* | 10/2020 | Jung | H04W 52/367 |
| 2020/0351858 | A1* | 11/2020 | Tsai | H04W 72/20 |
| 2020/0358589 | A1* | 11/2020 | Youtz | H04W 72/0446 |
| 2022/0022177 | A1* | 1/2022 | Xing | H04W 72/51 |
| 2022/0053429 | A1* | 2/2022 | Hu | H04W 52/367 |
| 2022/0070794 | A1* | 3/2022 | Lim | H04B 1/3838 |
| 2022/0078725 | A1* | 3/2022 | Zhou | H04W 52/367 |
| 2022/0124632 | A1* | 4/2022 | Zhou | H04L 5/0042 |
| 2022/0210743 | A1* | 6/2022 | Yi | H04W 52/34 |
| 2022/0400448 | A1* | 12/2022 | Umeda | H04W 52/02 |

FOREIGN PATENT DOCUMENTS

| | | | | |
|---|---|---|---|---|
| CN | 109587779 A | 4/2019 | | |
| CN | 109983809 A | 7/2019 | | |
| CN | 110140389 A | 8/2019 | | |
| WO | WO-2021052716 A1 * | 3/2021 | | H04W 24/10 |

OTHER PUBLICATIONS

CHTTL, "Discussion for EN-DC High Power UE with One TE FDD Band and 1 NR TDD Band," TSG-RAN Working Group 4 (Radio) #90, Agenda item 10.3.1, Feb. 25-Mar. 1, 2019, R4-1901242, Athens, Greece, 2 Pages.
Ericsson, "Increasing the Configured EN-DC Power for FDD-TDD PC3," TSG-RAN Working Group 4 (Radio) Meeting #91, Agenda item 6.5.5.3.3, May 13-17, 2019, R4-1906273, Reno, Nevada, US, 6 Pages.
CHTTL, "Further Discussion on Solutions for EN-DC FDD-TDD High Power UE," TSG-RAN Working Group 4 (Radio) Meeting #91, Agenda item 10.3.1, May 13-17, 2019, R4-1906469, Reno, Nevada, US, 3 Pages.
VIVM, "Discussion on Different Schemes for PC2 EN-DC (FDD+TDD)," 3GPP TSG-RAN Working Group 4 Meeting #92, Agenda item 11.3.1, Aug. 26-30, 2019, R4-1908862, Ljubljana, Slovenia, 3 Pages.
First Office Action for Chinese Application No. 201910926893.5, dated Jul. 20, 2021, 8 Pages.
International Search Report and Written Opinion for Application No. PCT/CN2020/118071, dated Dec. 8, 2020, 9 Pages.
Extended European Search Report, Application No. 20868702.0-1206, dated Feb. 21, 2023, 20 Pages.
OPPO, "Discussion on NSA FDD-TDD HPUE SAR solutions" Xi'an, China, 3GPP TSG-RAN WG4 Meeting #90bis, Apr. 2019, R4-1903055, 2 Pages.
First Office Action for Japanese Application No. 2022-519084, dated Apr. 18, 2023, 5 Pages.
KDDI, "Release independent handling for TDD-FDD dual uplink CA", 3GPP TSG-RAN WG4 #76, Beijing, China, R4-154264, Aug. 2015, 1 Page.
Huawei, HiSilicon, "On intra-band EN-DC Rx requirement", 3GPP TSG-RAN WG4 #90, Athens, Greece, Feb. 2019, R4-1901829, 2 Pages.
Second Office Action for Japanese Application No. 2022-519084, dated Oct. 17, 2023, 3 Pages.
NTT DOCOMO, Inc. "Effective use of power of PC2 UE with two different UL bands" 3GPP TSG RAN WG4 Meeting #92, Ljubljana, SI, Aug. 2019, R4-1909060, 4 Pages.
Third Office Action for Japanese Application No. 2022-519084, dated Apr. 5, 2024, 3 Pages.
CATT "TP for TR37.825 for SAR requirements" 3GPP TSG-RAN WG4 Meeting #91, Reno, USA, May 2019, R4-1905385, 3 Pages.
Nokia, Nokia Shanghai Bell "Maximum uplink duty cycle for FR2 UE and its implications" 3GPP TSG-RAN WG4 Meeting #91, Reno, USA, May 2019, R4-1906636, 3 Pages.

* cited by examiner

CAPABILITY PARAMETER DETERMINING METHOD, UPLINK SCHEDULING METHOD, TERMINAL, AND NETWORK-SIDE DEVICE

CROSS-REFERENCE TO RELATED APPLICATIONS

This application is a continuation application of International Application No. PCT/CN2020/118071 filed on Sep. 27, 2020, which claims priority to Chinese Patent Application No. 201910926893.5, filed on Sep. 27, 2019, which are incorporated herein by reference in their entireties.

TECHNICAL FIELD

The present invention relates to the field of communications technologies, and in particular, to a capability parameter determining method, an uplink scheduling method, a terminal, and a network-side device.

BACKGROUND

A terminal can simultaneously establish connections with two cells or two cell groups, which is called dual connectivity (DC). In a solution of implementing coverage enhancement using a high-power terminal, an uplink duty cycle (UL Dutycycle) in frequency division duplex (FDD) theoretically ranges from 0% to 100%, with a relatively large dynamic range. For a dual connectivity terminal with an FDD link, the relatively large dynamic range of the uplink duty cycle in FDD mode causes undetermined capability parameters of the other link in an uplink dual connectivity scenario, providing no reliable reference for the terminal to report capabilities and a network-side device to perform uplink scheduling.

SUMMARY

According to a first aspect, an embodiment of the present invention provides a capability parameter determining method, applied to a terminal, where a connection link of the terminal includes a first link and a second link, the first link is a frequency division duplex FDD link, and the method includes:

determining, based on a first maximum transmit power and a first maximum uplink duty cycle, a second maximum uplink duty cycle of the terminal at a second maximum transmit power;

where the first maximum transmit power and the first maximum uplink duty cycle both are capability parameters of the terminal on the first link, and the first maximum uplink duty cycle is a predefined capability parameter; and the second maximum transmit power and the second maximum uplink duty cycle both are capability parameters of the terminal on the second link.

According to a second aspect, an embodiment of the present invention provides an uplink scheduling method, applied to a network-side device, where the method includes:

performing, based on a first maximum uplink duty cycle and a second maximum uplink duty cycle of a terminal, uplink scheduling for the terminal on a first link and a second link respectively;

where the first link is a frequency division duplex FDD link, the first maximum uplink duty cycle is a capability parameter of the terminal on the first link, and the first maximum uplink duty cycle is a predetermined capability parameter; and the maximum uplink duty cycle is a capability parameter of the terminal on the second link.

According to a third aspect, an embodiment of the present invention provides a terminal, where a connection link of the terminal includes a first link and a second link, the first link is a frequency division duplex FDD link, and the terminal includes:

a determining module, configured to determine, based on a first maximum transmit power and a first maximum uplink duty cycle, a second maximum uplink duty cycle of the terminal at a second maximum transmit power;

where the first maximum transmit power and the first maximum uplink duty cycle both are capability parameters of the terminal on the first link, and the first maximum uplink duty cycle is a predefined capability parameter; and the second maximum transmit power and the second maximum uplink duty cycle both are capability parameters of the terminal on the second link.

According to a fourth aspect, an embodiment of the present invention provides a network-side device, including:

an uplink scheduling module, configured to perform, based on a first maximum uplink duty cycle and a second maximum uplink duty cycle of a terminal, uplink scheduling for the terminal on a first link and a second link respectively;

where the first link is a frequency division duplex FDD link, the first maximum uplink duty cycle is a capability parameter of the terminal on the first link, and the first maximum uplink duty cycle is a predetermined capability parameter; and the second maximum uplink duty cycle is a capability parameter of the terminal on the second link.

According to a fifth aspect, an embodiment of the present invention provides a terminal, including a memory, a processor, and a computer program stored in the memory and capable of running on the processor, where when the computer program is executed by the processor, the steps of the capability parameter determining method provided in the first aspect of the embodiments of the present invention are implemented.

According to a sixth aspect, an embodiment of the present invention provides a network-side device, including a memory, a processor, and a computer program stored in the memory and capable of running on the processor, where when the computer program is executed by the processor, the steps of the uplink scheduling method provided in the second aspect of the embodiments of the present invention are implemented.

According to a seventh aspect, an embodiment of the present invention provides a computer-readable storage medium, where the computer-readable storage medium stores a computer program, and when the computer program is executed by a processor, the steps of the capability parameter determining method provided in the first aspect of the embodiments of the present invention are implemented.

According to an eighth aspect, an embodiment of the present invention provides a computer-readable storage medium, where the computer-readable storage medium stores a computer program, and when the computer program is executed by a processor, the steps of the uplink scheduling method provided in the second aspect of the embodiments of the present invention are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following descriptions merely show some embodiments of the present invention, and a person of ordinary skill in the art may still derive other drawings from these accompanying drawings.

DETAILED DESCRIPTION

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention shall fall within the protection scope of the present invention.

In the specification and claims of this application, the term "include", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in the specification and claims represents at least one of connected objects. For example, A and/or B represents the following three cases: only A, only B, and both A and B.

In the embodiments of the present invention, the words such as "example" or "for example" are used for illustration or description. Any example or design solution described as "example" or "for example" in the embodiments of the present invention shall not be interpreted as being more preferable or advantageous than other embodiments or design solutions. Specifically, the words such as "example" or "for example" are intended to present related concepts in a specific way.

A solution of implementing coverage enhancement using a high-power terminal and a related solution of terminal capability parameter reporting are briefly described prior to detailed description of the technical solutions of the embodiments of the present invention.

Figure 1:
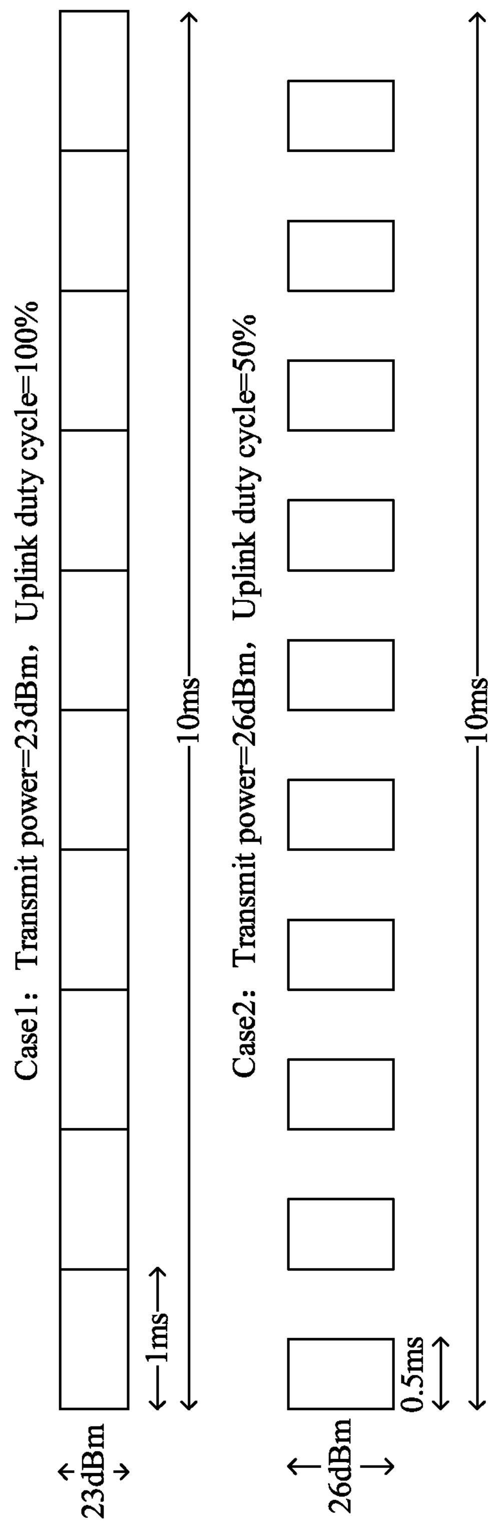
FIG. 1 is a schematic diagram of a dual connectivity mobility process.

In the solution design of implementing coverage enhancement using a high-power terminal, transmission is performed at a high power during valid data transmission by controlling an uplink duty cycle, for example, reducing the uplink duty cycle until UL Dutycycle<100%, to implement coverage enhancement while ensuring that total radiation (for example, a specific absorption rate (SAR)) of the terminal counted within a relatively long period (for example, 6 minutes frequently used for device authentication) does not exceed limits. For example, as shown in FIG. 1, in a first case, the terminal performs transmission at a transmit power of 23 dBm and an UL Dutycycle of 100%; and in a second case, the terminal performs transmission at a transmit power of 26 dBm and an UL Dutycycle of 50%. The radiation effects counted within a relatively long period (for example, 6 minutes) are similar in the two cases. In the second case, the terminal can implement coverage enhancement at a higher transmit power (for example, 26 dBm) during valid data transmission.

Under the condition that the total radiation does not exceed limits, uplink duty cycles supported by different high-power terminals are different (for example, the UL Dutycycle may range from 10% to 100%) at a specific power level. Such value is a capability parameter of the terminal and needs to be reported to a network-side device as a reference for the network-side device to perform uplink scheduling and for the terminal to operate.

For a 5G SA single-connection time division duplex (TDD) terminal, the maximum uplink duty cycle (maxUplinkDutyCycle) is defined in the 3GPP standard, to indicate a maximum capability of an uplink duty cycle UL Dutycycle of the high-power terminal at a transmit power of 26 dBm.

For the terminal with multiple connection links in uplink, radiation is an overall comprehensive effect of multiple connections, so that combinations of the multiple connections need to be balanced, to ensure that the total radiation does not exceed a total radiation threshold, for example, duty1×Tx_power1+duty2×Tx_power2+ . . . ≤limit value. In an example of a 5G ENDC LTE TDD+NR TDD dual connectivity terminal, based on LTE-specific uplink-downlink slot ratio configuration and a maximum UL Dutycycle corresponding to LTE TDD at such uplink-downlink slot ratio configuration, the 3GPP standard has defined a maximum uplink duty cycle maxUplinkDutyCycle of a high-power terminal that can be supported by an NR link on this basis as a terminal capability, to provide a reference for the network-side device to perform uplink scheduling and for the terminal to operate. For example, LTE_TDD_max_UL_dutycycle×LTE_Tx_power+maxUplinkDutyCycle×NR_Tx_power≤limit value herein, the limit value may be determined based on the total radiation threshold and an implementation scheme of the terminal (for example, technical performance parameters of the terminal), and different terminals may correspond to different limit values.

For a dual connectivity terminal with an FDD link, the uplink duty cycle UL Dutycycle in FDD mode theoretically ranges from 0% to 100%, and such relatively large dynamic range causes undetermined capability parameters of the other link in an uplink dual connectivity scenario, providing no reliable reference for the terminal to report capabilities and a network-side device to perform uplink scheduling.

In view of this, to resolve the foregoing problem, the embodiments of the present invention provide a capability parameter determining method, an uplink scheduling method, a terminal, and a network-side device.

The following describes the embodiments of the present invention with reference to the accompanying drawings. The embodiments provided in the present invention can be applied to a wireless communications system. The wireless communications system may be a 5G system, or an evolved long term evolution (eLTE) system, or a later evolved communications system.

Figure 2:
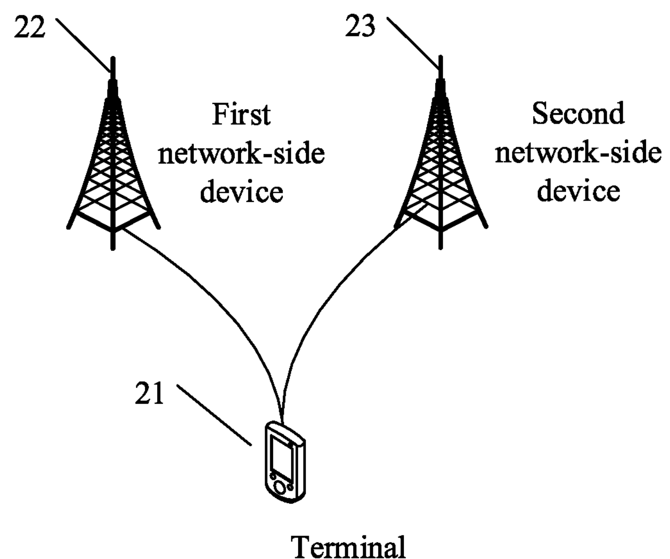
FIG. 2 is a structural diagram of a network system according to an embodiment of the present invention.

FIG. 2 is a structural diagram of a network system according to an embodiment of the present invention. As shown in FIG. 2, the network system includes a terminal 21, a first network-side device 22, and a second network-side device 23, where the terminal 21 is a dual connectivity terminal and is connected to both the first network-side device 22 and the second network-side device 23. A connection link of the terminal 21 includes a first link and a second link, and the first link is an FDD link. The terminal 21 may be a mobile communications device, for example, may be a mobile phone, a tablet personal computer, a laptop computer, a personal digital assistant (PDA), a mobile internet device (MID), a wearable device, or the like. It should be noted that the specific type of the terminal 21 is not limited in the embodiments of the present invention. The first network-side device 22 and the second network-side device 23 may be physically different devices, or may be a same device. The first network-side device 22 and the second network-side device 23 may be 5G network-side devices (for example, gNBs or 5G NR NBs), or 4G network-side devices (for example, eNBs), or 3G network-side devices (for example, NBs), or network-side devices in the later evolved communications system, or the like. It should be noted that the specific types of the first network-side device 22 and the second network-side device 23 are not limited in the embodiments of the present invention.

Figure 3:
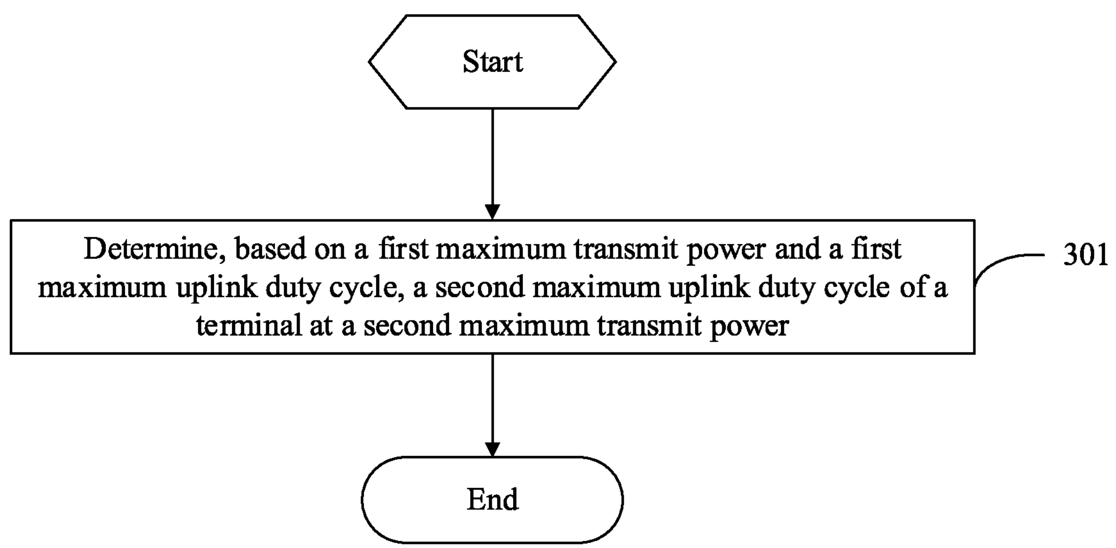
FIG. 3 is a flowchart of a capability parameter determining method applied to a terminal according to an embodiment of the present invention.

FIG. 3 is a flowchart of a capability parameter determining method according to an embodiment of the present invention. As shown in FIG. 3, the capability parameter determining method is applied to a terminal, where a connection link of the terminal includes a first link and a second link, and the first link is a frequency division duplex FDD link. The method includes the following steps.

Step 301: Determine, based on a first maximum transmit power and a first maximum uplink duty cycle, a second maximum uplink duty cycle of the terminal at a second maximum transmit power.

The first maximum transmit power and the first maximum uplink duty cycle both are capability parameters of the terminal on the first link, and the first maximum uplink duty cycle is a predefined capability parameter; and the second maximum transmit power and the second maximum uplink duty cycle both are capability parameters of the terminal on the second link.

In this embodiment of the present invention, the maximum uplink duty cycle (that is, the first maximum uplink duty cycle) of the first link, namely the FDD link, is predefined. In this way, the uplink duty cycle of the FDD link originally with a relatively large dynamic range is determined, so that the terminal can determine, based on the maximum uplink duty cycle and maximum transmit power (that is, the first maximum transmit power) on the first link, the maximum uplink duty cycle (that is, the second maximum uplink duty cycle) that can be supported by the terminal on the second link at a specific maximum transmit power (that is, the second maximum transmit power). In this way, reference can be provided for the terminal to perform overall capability parameter reporting, for the network-side device to perform uplink scheduling behaviors, for the terminal to perform uplink transmission behaviors, and the like, helping improve communication performance in the uplink dual connectivity scenario.

Optionally, the method further includes:

reporting the second maximum uplink duty cycle.

Specifically, after determining the capability parameter on the second link, the terminal can report the capability parameter of the terminal on the second link to the network-side device at appropriate time, that is, the second maximum uplink duty cycle of the terminal at the second maximum transmit power. In this way, after receiving the capability parameter of the terminal on the second link, the network-side device can perform uplink scheduling for the terminal with reference to the capability parameter of the terminal on the second link.

The terminal may report the second maximum uplink duty cycle at the first startup of the terminal or at any appropriate time after that.

The second link may be an FDD link or a TDD link.

The first maximum uplink duty cycle is a predefined capability parameter. In the case of predefining the first maximum uplink duty cycle, the first maximum uplink duty cycle may be determined based on the technical performance parameters of the terminal, or the first maximum uplink duty cycle may be prescribed in a protocol.

Correspondingly, the first maximum transmit power and the second maximum transmit power may also be determined based on the technical performance parameters of the terminal or prescribed in a protocol.

As described above, for the terminal with multiple connection links in uplink, radiation is an overall comprehensive effect of the multiple connections, so that combinations of the multiple connections need to be balanced, to ensure that total radiation does not exceed a total radiation threshold.

In view of this, in the embodiments of the present invention, for the terminal with the first link and the second link, the total radiation generated on the two links shall not exceed the total radiation threshold. Therefore, in the case of determining the second maximum uplink duty cycle of the terminal at the second maximum transmit power, the second maximum uplink duty cycle of the terminal at the second maximum transmit power may be determined jointly based on the first maximum transmit power, the first maximum uplink duty cycle, and the total radiation threshold.

That is, the determining, based on a first maximum transmit power and a first maximum uplink duty cycle, a second maximum uplink duty cycle of the terminal at a second maximum transmit power includes:

determining, based on the first maximum transmit power, the first maximum uplink duty cycle, and a total radiation threshold, the second maximum uplink duty cycle of the terminal at the second maximum transmit power.

$$\text{First maximum transmit power}\times\text{First maximum uplink duty cycle}+\text{Second maximum transmit power}\times\text{Second maximum uplink duty cycle}\leq\text{Limit value.}$$

Herein, the limit value may be determined based on the total radiation threshold and an implementation scheme of the terminal (for example, technical performance parameters of the terminal), and different terminals may correspond to different limit values.

In this implementation, the second maximum uplink duty cycle of the terminal at the second maximum transmit power is determined jointly based on the first maximum transmit power, the first maximum uplink duty cycle, and the total radiation threshold, so that the determined second maximum uplink duty cycle of the terminal at the second maximum transmit power is more reasonable and of greater reference value.

The capability parameter determining method provided in the embodiments of the present invention is simple and feasible, and is applicable to various scenarios that require an uplink dual connectivity high-power terminal, for example, E-UTRA/NR dual connectivity (ENDC) with an FDD link, uplink carrier aggregation, and supplementary uplink (SUL).

Specifically, the capability parameter determining method provided in this embodiment of the present invention is applicable to at least one of the following scenarios:

4G FDD-TDD dual connectivity ENDC;
5G FDD-TDD dual connectivity ENDC;
4G FDD-FDD dual connectivity ENDC;
5G FDD-FDD dual connectivity ENDC;
5G FDD-TDD uplink carrier aggregation;
5G FDD-FDD uplink carrier aggregation;
4G FDD-TDD uplink carrier aggregation;
4G FDD-FDD uplink carrier aggregation;
5G FDD-TDD SUL; or
5G FDD-FDD SUL.

Optionally, the method further includes:

if an uplink duty cycle scheduled by a network-side device for the first link is less than or equal to the first maximum uplink duty cycle and an uplink duty cycle scheduled by the network-side device for the second link is less than or equal to the second maximum uplink duty cycle, performing, by the terminal, uplink transmission on the first link at a first transmit power and performing uplink transmission on the second link at a second transmit power;

where the first transmit power is less than or equal to the first maximum transmit power; and the second transmit power is less than or equal to the second maximum transmit power.

To be specific, when uplink transmission scheduled by the network-side device is within a high-power capability range of the terminal, that is, when the uplink duty cycle scheduled by the network-side device for the first link is less than or equal to the first maximum uplink duty cycle and the uplink duty cycle scheduled by the network-side device for the second link is less than or equal to the second maximum uplink duty cycle, the uplink transmission may be performed by the terminal on each of the links at the maximum transmit power.

It should be noted that when uplink transmission scheduled by the network-side device is within the high-power capability range of the terminal, the uplink transmission may be performed by the terminal on each of the links at the maximum transmit power or at a transmit power less than the maximum transmit power. This is not limited in the embodiments of the present invention.

Optionally, the method further includes:

if an uplink duty cycle scheduled by a network-side device for the first link is greater than the first maximum uplink duty cycle or an uplink duty cycle scheduled by the network-side device for the second link is greater than the second maximum uplink duty cycle, performing, by the terminal, uplink transmission on the first link at a third transmit power and performing uplink transmission on the second link at a fourth transmit power;

where the third transmit power is less than the first maximum transmit power; and/or the fourth transmit power is less than the second maximum transmit power.

To be specific, when uplink transmission scheduled by the network-side device is beyond the high-power capability range of the terminal, that is, when the uplink duty cycle scheduled by the network-side device for the first link is greater than the first maximum uplink duty cycle or the uplink duty cycle scheduled by the network-side device for the second link is greater than the second maximum uplink duty cycle, the terminal cannot perform the uplink transmission at the first maximum transmit power and the second maximum transmit power simultaneously, but needs to perform specific power backoff, that is, perform the uplink transmission on one or all of the links of the terminal at the transmit power less than the maximum transmit power, to ensure that the total radiation does not exceed limits. For example, the uplink transmission is performed by the terminal on the first link at the transmit power less than the first maximum transmit power, or the uplink transmission is performed by the terminal on the second link at the transmit power less than the second maximum transmit power. Alternatively, the uplink transmission is performed by the terminal on the first link at a transmit power less than the first maximum transmit power, and the uplink transmission is performed on the second link at a transmit power less than the second maximum transmit power.

The following examples describes a specific method for determining, by the terminal, the second maximum uplink duty cycle at the second maximum transmit power.

For an ENDC dual connectivity terminal, it is assumed that Plte represents a maximum transmit power on an LTE link, that Pnr represents a maximum transmit power on an NR link, and that Ptotal represents a total maximum transmit power. DutyLTE represents an uplink duty cycle on the LTE link. DutyNR represents an uplink duty cycle on the NR link.

Example 1: In the case of high-power terminal configurations of Plte=23 dBm, Pnr=23 dBm, and Ptotal=26 dBm, if DutyLTE=70% and Plte=23 dBm are used as reference configurations of the LTE FDD link, the maximum uplink duty cycle maxUplinkDutyCycle of the NR link is reported based on such reference configurations. That means in a scenario of DutyLTE=70%, Plte=23 dBm, DutyNR=maxUplinkDutyCycle, Pnr=23 dBm, and Ptotal=26 dBm, the terminal can ensure that the total radiation (for example, a specific absorption rate SAR) does not exceed limits, that is, the total radiation is less than or equal to the total radiation threshold. In the embodiments of the present invention, the limit value may be determined based on the total radiation threshold and an implementation scheme of the terminal (for example, technical performance parameters of the terminal), to ensure that the total radiation of the terminal on all the links is less than or equal to the total radiation threshold. That is, $$(\text{DutyLTE}=70\%)\times(\text{LTE\_Tx\_power}=23\text{ dBm})+\text{maxUplinkDutyCycle}\times(\text{NR\_Tx\_power}=23\text{ dBm})\leq\text{limit value}$$

in this case, the terminal may be scheduled by the network-side device to perform uplink transmission with DutyLTE≤70%, Plte≤23 dBm, DutyNR≤maxUplinkDutyCycle, Pnr≤23 dBm, and Ptotal≤26 dBm. In the case of DutyLTE>70% or DutyNR>maxUplinkDutyCycle scheduled by the network-side device, to ensure that the total radiation does not exceed limits, the terminal performs specific power backoff on a specific link or all the links, so that the maximum transmit power of Plte=23 dBm, Pnr=23 dBm, and Ptotal=26 dBm cannot be implemented.

Example 2: In the case of high-power terminal configurations of Plte=23 dBm, Pnr=26 dBm, and Ptotal=26 dBm, if DutyLTE=40% and Plte=23 dBm are used as reference configurations of the LTE FDD link, the maximum uplink duty cycle maxUplinkDutyCycle of the NR link is reported based on such reference configurations. That means in a scenario of DutyLTE=40%, Plte=23 dBm, DutyNR=maxUplinkDutyCycle, Pnr=26 dBm, and Ptotal=26 dBm, the terminal can ensure that the total radiation (for example, a specific absorption rate SAR) does not exceed limits, that is, the total radiation is less than or equal to the total radiation threshold. In the embodiments of the present invention, the limit value may be determined based on the total radiation threshold and an implementation scheme of the terminal (for example, technical performance parameters of the terminal), to ensure that the total radiation of the terminal on all the links is less than or equal to the total radiation threshold. That is, $$(\text{DutyLTE}=40\%)\times(\text{LTE\_Tx\_power}=23\text{ dBm})+\text{maxUplinkDutyCycle}\times(\text{NR\_Tx\_power}=26\text{ dBm})\leq\text{limit value}$$

in this case, the terminal may be scheduled by the network-side device to perform uplink transmission with DutyLTE≤40%, Plte≤23 dBm, DutyNR≤maxUplinkDutyCycle, Pnr≤26 dBm, and Ptotal≤26 dBm. In the case of DutyLTE>40% or DutyNR>maxUplinkDutyCycle scheduled by the network-side device, to ensure that the total radiation does not exceed limits, the terminal performs specific power backoff on a specific link or all the links, so that the maximum transmit power of Plte=23 dBm, Pnr=26 dBm, and Ptotal=26 dBm cannot be implemented.

In the embodiments of the present invention, a group of reference capability parameter configurations on the first link may be predefined, for example, DutyLTE=70% and Plte=23 dBm, or DutyLTE=40% and Plte=23 dBm. Alternatively, multiple combinations of reference capability parameter configurations on the first link may be predefined. Correspondingly, the terminal may determine multiple combinations of capability parameters on the second link. For example, if two groups of reference capability parameter configurations on the first link, {DutyLTE1, Plte1; DutyLTE2, Plte2} are predefined, the terminal will correspondingly have two groups of maximum uplink duty cycles maxUplinkDutyCycle at a specific maximum transmit power on the second link, {maxUplinkDutyCycle1, maxUplinkDutyCycle2}. In this way, due to the multiple combinations of capability parameters of the terminal on the first link and the second link, the network-side device can more flexibly perform uplink scheduling for the terminal based on the multiple combinations of capability parameters.

In other words, the capability parameters of the terminal on the first link are present in N groups, and each group of the capability parameters include one first maximum transmit power and one first maximum uplink duty cycle, where N is an integer greater than 1.

The determining, based on a first maximum transmit power and a first maximum uplink duty cycle, a second maximum uplink duty cycle of the terminal at a second maximum transmit power includes:

determining, based on the first maximum transmit power and the first maximum uplink duty cycle in each group of the capability parameters, the second maximum uplink duty cycle of the terminal at the second maximum transmit power.

The following examples describe a specific method for determining, by the terminal, the capability parameters on the second link when there are multiple combinations of reference capability parameter configurations of the terminal on the first link.

For example, in the case of Plte=23 dBm, Pnr=23 dBm, and Ptotal=26 dBm, the LTE FDD reference configurations {DutyLTE1=70%, Plte1=23 dBm; DutyLTE2=40%, Plte2=23 dBm} may be used, and corresponding to Pnr=23 dBm and Ptotal=26 dBm, the maximum uplink duty cycles of the NR link that ensure the total radiation does not exceed limits are {maxUplinkDutyCycle1, maxUplinkDutyCycle2}, that is, $$(\text{DutyLTE}=70\%)\times(\text{LTE\_Tx\_power}=23\text{ dBm})+\text{maxUplinkDutyCycle1}\times(\text{NR\_Tx\_power}=23\text{ dBm})\leq\text{limit value}$$

and $$(\text{DutyLTE}=40\%)\times(\text{LTE\_Tx\_power}=23\text{ dBm})+\text{maxUplinkDutyCycle2}\times(\text{NR\_Tx\_power}=23\text{ dBm})\leq\text{limit value.}$$

This case means that the terminal is capable of ensuring the up-to-standard total radiation both in a scenario of DutyLTE≤70%, PLTE≤23 dBm, DutyNR≤maxUplinkDutyCycle1, Pnr≤23 dBm, and Ptotal≤26 dBm and in a scenario of DutyLTE≤40%, PLTE≤23 dBm, DutyNR≤maxUplinkDutyCycle2, Pnr≤23 dBm, and Ptotal≤≤26 dBm, and the network-side device can perform corresponding uplink scheduling for the terminal. When network scheduling is beyond the foregoing capabilities, the terminal performs power backoff.

For example, in the case of Plte=23 dBm, Pnr=26 dBm, and Ptotal=26 dBm, the LTE FDD reference configurations {DutyLTE1=40%, PLTE1=23 dBm; DutyLTE2=20%, PLTE2=23 dBm} may be used, and corresponding to Pnr=26 dBm and Ptotal=26 dBm, the maximum uplink duty cycles of the NR link that ensure the total radiation does not exceed limits are {maxUplinkDutyCycle1, maxUplinkDutyCycle2}, that is, $$(\text{DutyLTE}=40\%)\times(\text{LTE\_Tx\_power}=23\text{ dBm})+\text{maxUplinkDutyCycle1}\times(\text{NR\_Tx\_power}=26\text{ dBm})\leq\text{limit value}$$

and $$(\text{DutyLTE}=20\%)\times(\text{LTE\_Tx\_power}=23\text{ dBm})+\text{maxUplinkDutyCycle2}\times(\text{NR\_Tx\_power}=26\text{ dBm})\leq\text{limit value.}$$

This case means that the terminal is capable of ensuring the up-to-standard total radiation both in a scenario of DutyLTE≤40%, PLTE≤23 dBm, DutyNR≤maxUplinkDutyCycle1, Pnr≤26 dBm, and Ptotal≤26 dBm and in a scenario of DutyLTE≤20%, PLTE≤23 dBm, DutyNR≤maxUplinkDutyCycle2, Pnr≤26 dBm, and Ptotal≤26 dBm, and the network-side device can perform corresponding scheduling. When scheduling by the network-side device is beyond the foregoing capabilities, the terminal performs power backoff.

In the foregoing implementations, for a dual connectivity terminal with an FDD link, the maximum uplink duty cycle of the FDD link is predefined. In this way, because the maximum uplink duty cycle of the FDD link has been determined, the maximum uplink duty cycle of the other link can also be determined in the uplink dual connectivity scenario. Therefore, reference can be provided for the terminal to perform overall capability parameter reporting, for the network-side device to perform uplink scheduling behaviors, for the terminal to perform uplink transmission behaviors, and the like, helping improve communication performance in the uplink dual connectivity scenario. The capability parameter determining method provided in the embodiments of the present invention is simple and feasible, and is applicable to various scenarios that require an uplink dual connectivity high-power terminal, for example, ENDC with an FDD link, uplink carrier aggregation, and SUL.

Figure 4:
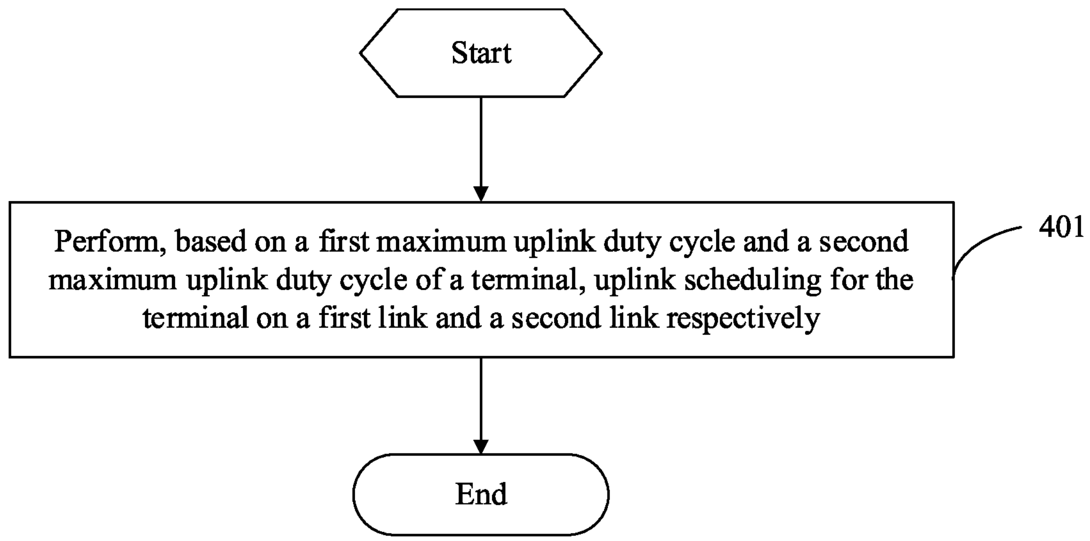
FIG. 4 is a flowchart of an uplink scheduling method applied to a network-side device according to an embodiment of the present invention.

FIG. 4 is a flowchart of an uplink scheduling method according to an embodiment of the present invention. As shown in FIG. 4, the uplink scheduling method is applied to a network-side device, and the method includes the following steps.

Step 401: Perform, based on a first maximum uplink duty cycle and a second maximum uplink duty cycle of a terminal, uplink scheduling for the terminal on a first link and a second link respectively.

The first link is a frequency division duplex FDD link, the first maximum uplink duty cycle is a capability parameter of the terminal on the first link, and the first maximum uplink duty cycle is a predetermined capability parameter; and the second maximum uplink duty cycle is a capability parameter of the terminal on the second link.

Optionally, the method further includes:

receiving the second maximum uplink duty cycle reported by the terminal.

In the embodiments of the present invention, for a dual connectivity terminal with an FDD link, the maximum uplink duty cycle of the FDD link is predefined. In this way, because the maximum uplink duty cycle of the FDD link has been determined, the maximum uplink duty cycle of the other link can also be determined in the uplink dual connectivity scenario. Therefore, reference can be provided for the network-side device to perform uplink scheduling behaviors, helping improve communication performance in the uplink dual connectivity scenario. The uplink scheduling method provided in the embodiments of the present invention is simple and feasible, and is applicable to various scenarios that require an uplink dual connectivity high-power terminal, for example, ENDC with an FDD link, uplink carrier aggregation, and SUL.

It should be noted that, in the embodiments of the present invention, for specific implementations of the embodiment of the network-side device corresponding to the embodiment shown in FIG. 4, reference may be made to relevant description of the embodiment shown in FIG. 4 and the same beneficial effects can be implemented. To avoid repeated descriptions, details are not described herein again.

Figure 5:
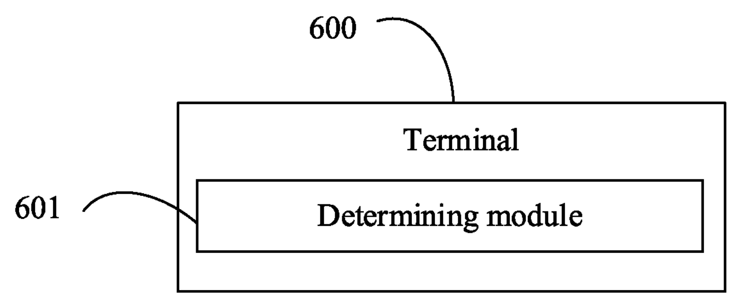
FIG. 5 is a schematic structural diagram of a terminal according to an embodiment of the present invention.

FIG. 5 is a structural diagram of a terminal according to an embodiment of the present invention. As shown in FIG. 5, the terminal 600 includes:

a determining module 601, configured to determine, based on a first maximum transmit power and a first maximum uplink duty cycle, a second maximum uplink duty cycle of the terminal at a second maximum transmit power;

where the first maximum transmit power and the first maximum uplink duty cycle both are capability parameters of the terminal on the first link, and the first maximum uplink duty cycle is a predefined capability parameter; and the second maximum transmit power and the second maximum uplink duty cycle both are capability parameters of the terminal on the second link.

Optionally, the determining module 601 is specifically configured to:

determine, based on the first maximum transmit power, the first maximum uplink duty cycle, and a total radiation threshold, the second maximum uplink duty cycle of the terminal at the second maximum transmit power.

Optionally, the capability parameters of the terminal on the first link are present in N groups, and each group of the capability parameters include one first maximum transmit power and one first maximum uplink duty cycle, where N is an integer greater than 1.

The determining module 601 is specifically configured to:

determine, based on the first maximum transmit power and the first maximum uplink duty cycle in each group of the capability parameters, the second maximum uplink duty cycle of the terminal at the second maximum transmit power.

Optionally, the terminal 600 further includes:

a first uplink transmission module, configured to: if an uplink duty cycle scheduled by a network-side device for the first link is less than or equal to the first maximum uplink duty cycle and an uplink duty cycle scheduled by the network-side device for the second link is less than or equal to the second maximum uplink duty cycle, perform, for the terminal, uplink transmission on the first link at a first transmit power and perform uplink transmission on the second link at a second transmit power;

where the first transmit power is less than or equal to the first maximum transmit power; and the second transmit power is less than or equal to the second maximum transmit power.

Optionally, the terminal 600 further includes:

a second uplink transmission module, configured to: if an uplink duty cycle scheduled by a network-side device for the first link is greater than the first maximum uplink duty cycle or an uplink duty cycle scheduled by the network-side device for the second link is greater than the second maximum uplink duty cycle, perform, for the terminal, uplink transmission on the first link at a third transmit power and perform uplink transmission on the second link at a fourth transmit power;

where the third transmit power is less than the first maximum transmit power; and/or the fourth transmit power is less than the second maximum transmit power.

Optionally, the terminal 600 further includes:

a reporting module, configured to report the second maximum uplink duty cycle.

Optionally, the first maximum uplink duty cycle is determined based on a technical performance parameter of the terminal or prescribed in a protocol.

Optionally, the second link is an FDD link or a time division duplex TDD link.

Optionally, the terminal is applicable to at least one of the following scenarios:

4G FDD-TDD dual connectivity ENDC;
5G FDD-TDD dual connectivity ENDC;
4G FDD-FDD dual connectivity ENDC;
5G FDD-FDD dual connectivity ENDC;
5G FDD-TDD uplink carrier aggregation;
5G FDD-FDD uplink carrier aggregation;
4G FDD-TDD uplink carrier aggregation;
4G FDD-FDD uplink carrier aggregation;
5G FDD-TDD supplementary uplink SUL; or
5G FDD-FDD supplementary uplink SUL.

It should be noted that, in this embodiment of the present invention, the terminal 600 may be a terminal in any implementation of the method embodiments, and any implementation of the terminal in the method embodiments may be implemented by the terminal 600 in this embodiment of the present invention, with the same beneficial effects achieved. To avoid repetition, details are not described herein again.

Figure 6:
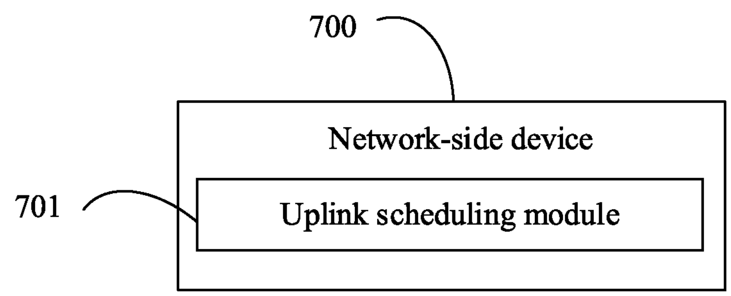
FIG. 6 is a schematic structural diagram of a network-side device according to an embodiment of the present invention.

FIG. 6 is a structural diagram of a network-side device according to an embodiment of the present invention. As shown in FIG. 6, the network-side device 700 includes:

an uplink scheduling module 701, configured to perform, based on a first maximum uplink duty cycle and a second maximum uplink duty cycle of a terminal, uplink scheduling for the terminal on a first link and a second link respectively;

where the first link is a frequency division duplex FDD link, the first maximum uplink duty cycle is a capability parameter of the terminal on the first link, and the first maximum uplink duty cycle is a predetermined capability parameter; and the second maximum uplink duty cycle is a capability parameter of the terminal on the second link.

Optionally, the network-side device 700 further includes:

a receiving module, configured to receive the second maximum uplink duty cycle reported by the terminal.

It should be noted that, in this embodiment of the present invention, the network-side device 700 may be a network-side device in any implementation of the method embodiments, and any implementation of the network-side device in the method embodiments may be implemented by the network-side device 700 in this embodiment of the present invention, with the same beneficial effects achieved. To avoid repetition, details are not described herein again.

Figure 7:
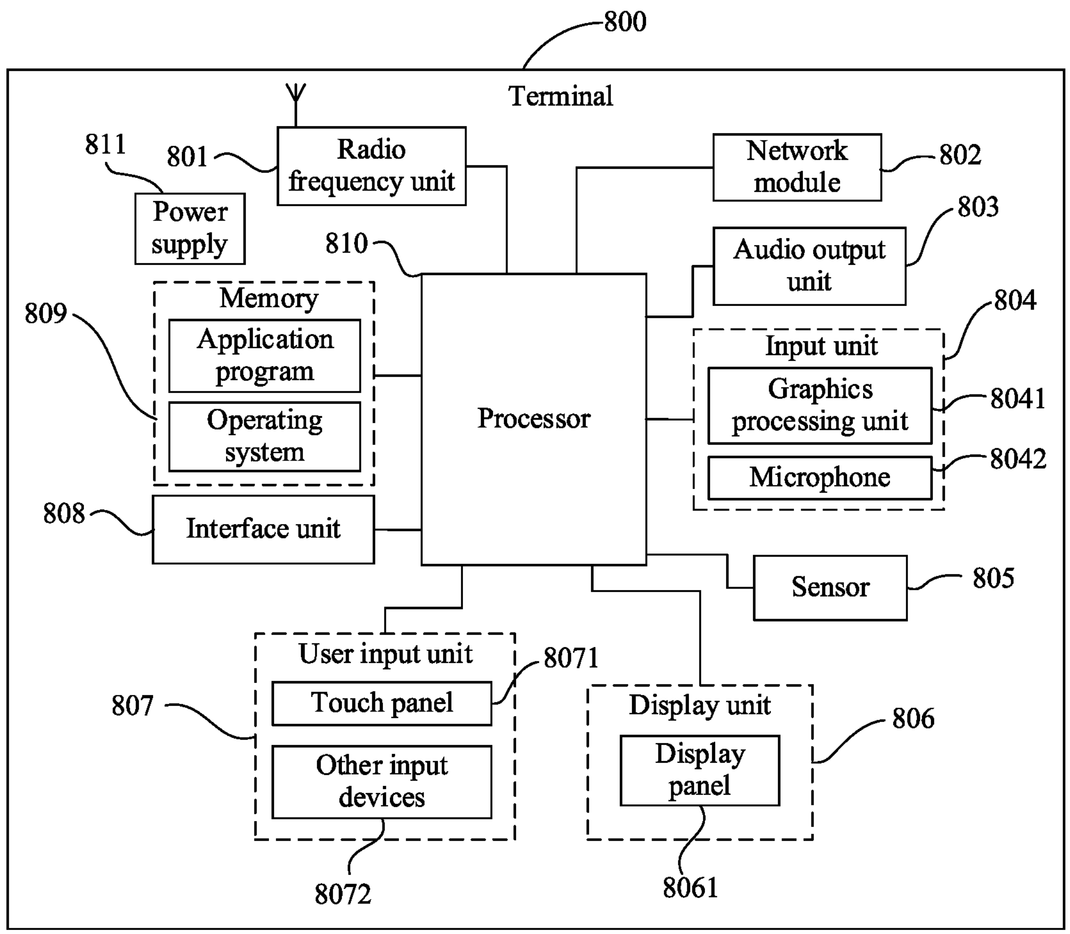
FIG. 7 is a schematic diagram of a hardware structure of a terminal according to an embodiment of the present invention.

FIG. 7 is a schematic diagram of a hardware structure of a terminal according to an embodiment of the present invention. The terminal 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components. Persons skilled in the art may understand that the terminal structure shown in FIG. 7 does not constitute limitations on the terminal, the terminal may include more or fewer components than those shown in the figure, or combinations of some components, or different component layouts. In the embodiments of the present invention, the terminal includes but is not limited to a mobile phone, a tablet personal computer, a laptop computer, a palmtop computer, a vehicle-mounted terminal, a wearable device, a pedometer, and the like.

The radio frequency unit 801 or the processor 810 is configured to:

determine, based on a first maximum transmit power and a first maximum uplink duty cycle, a second maximum uplink duty cycle of the terminal at a second maximum transmit power;

where the first maximum transmit power and the first maximum uplink duty cycle both are capability parameters of the terminal on the first link, and the first maximum uplink duty cycle is a predefined capability parameter; and the second maximum transmit power and the second maximum uplink duty cycle both are capability parameters of the terminal on the second link.

Optionally, the radio frequency unit 801 or the processor 810 is specifically configured to:

determine, based on the first maximum transmit power, the first maximum uplink duty cycle, and a total radiation threshold, the second maximum uplink duty cycle of the terminal at the second maximum transmit power.

Optionally, the capability parameters of the terminal on the first link are present in N groups, and each group of the capability parameters include one first maximum transmit power and one first maximum uplink duty cycle, where N is an integer greater than 1.

The radio frequency unit 801 or the processor 810 is specifically configured to:

determine, based on the first maximum transmit power and the first maximum uplink duty cycle in each group of the capability parameters, the second maximum uplink duty cycle of the terminal at the second maximum transmit power.

Optionally, the radio frequency unit 801 is further configured to:

if an uplink duty cycle scheduled by a network-side device for the first link is less than or equal to the first maximum uplink duty cycle and an uplink duty cycle scheduled by the network-side device for the second link is less than or equal to the second maximum uplink duty cycle, perform, for the terminal, uplink transmission on the first link at a first transmit power and perform uplink transmission on the second link at a second transmit power;

where the first transmit power is less than or equal to the first maximum transmit power; and the second transmit power is less than or equal to the second maximum transmit power.

Optionally, the radio frequency unit 801 is further configured to:

if an uplink duty cycle scheduled by a network-side device for the first link is greater than the first maximum uplink duty cycle or an uplink duty cycle scheduled by the network-side device for the second link is greater than the second maximum uplink duty cycle, perform, for the terminal, uplink transmission on the first link at a third transmit power and perform uplink transmission on the second link at a fourth transmit power;

where the third transmit power is less than the first maximum transmit power; and/or the fourth transmit power is less than the second maximum transmit power.

Optionally, the radio frequency unit 801 is further configured to:

report the second maximum uplink duty cycle.

Optionally, the first maximum uplink duty cycle is determined based on a technical performance parameter of the terminal or prescribed in a protocol.

Optionally, the second link is an FDD link or a time division duplex TDD link.

Optionally, the terminal 800 is applicable to at least one of the following scenarios:

4G FDD-TDD dual connectivity ENDC;
5G FDD-TDD dual connectivity ENDC;
4G FDD-FDD dual connectivity ENDC;
5G FDD-FDD dual connectivity ENDC;
5G FDD-TDD uplink carrier aggregation;
5G FDD-FDD uplink carrier aggregation;
4G FDD-TDD uplink carrier aggregation;
4G FDD-FDD uplink carrier aggregation;
5G FDD-TDD supplementary uplink SUL; or
5G FDD-FDD supplementary uplink SUL.

In the embodiments of the present invention, for a dual connectivity terminal with an FDD link, the maximum uplink duty cycle of the FDD link is predefined. In this way, because the maximum uplink duty cycle of the FDD link has been determined, the maximum uplink duty cycle of the other link can also be determined in the uplink dual connectivity scenario. Therefore, reference can be provided for the terminal to perform overall capability parameter reporting, for the network-side device to perform uplink scheduling behaviors, for the terminal to perform uplink transmission behaviors, and the like, helping improve communication performance in the uplink dual connectivity scenario. The capability parameter determining method provided in the embodiments of the present invention is simple and feasible, and is applicable to various scenarios that require an uplink dual connectivity high-power terminal, for example, ENDC with an FDD link, uplink carrier aggregation, and SUL.

It should be understood that, in this embodiment of the present invention, the radio frequency unit 801 may be configured to receive or transmit a signal in an information reception or transmission or call process. Specifically, after receiving downlink data from a base station, the radio frequency unit 801 transmits the downlink data to the processor 810 for processing, and also transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may also communicate with a network and other devices through a wireless communications system.

The terminal provides a user with wireless broadband Internet access by using the network module 802, for example, helping the user receive and send emails, browsing web pages and accessing streaming media.

The audio output unit 803 may convert audio data received by the radio frequency unit 801 or the network module 802 or stored in the memory 809 into an audio signal and output the audio signal as a sound. Moreover, the audio output unit 803 may also provide an audio output (for example, a call signal reception sound or a message reception sound) related to a specific function implemented by the terminal 800. The audio output unit 803 includes a loudspeaker, a buzzer, a receiver, and the like.

The input unit 804 is configured to receive an audio or video signal. The input unit 804 may include a graphics processing unit (GPU) 8041 and a microphone 8042. The graphics processing unit 8041 processes image data of static pictures or videos obtained by an image capturing apparatus (such as a camera) in a video capturing mode or an image capturing mode. A processed image frame may be displayed on a display unit 806. The image frame processed by the graphics processing unit 8041 may be stored in the memory 809 (or another storage medium) or transmitted by the radio frequency unit 801 or the network module 802. The microphone 8042 can receive a sound and process the sound into audio data. The processed audio data may be converted into a format that can be transmitted to a mobile communication base station through the radio frequency unit 801 in a telephone call mode, for outputting.

The terminal 800 further includes at least one sensor 805, for example, an optical sensor, a motion sensor, and another sensor. Specifically, the optical sensor includes an ambient light sensor and a proximity sensor. The ambient light sensor may adjust luminance of a display panel 8061 based on brightness of ambient light, and the proximity sensor may turn off the display panel 8061 and backlight when the terminal 800 moves to an ear. As one type of motion sensor, an accelerometer sensor may detect magnitudes of accelerations in various directions (usually, three axes), may detect, in a still state, a magnitude and a direction of gravity, and may be configured to recognize a terminal posture (for example, screen switching between a landscape mode and a portrait mode, related games, and magnetometer posture calibration), implement a vibration recognition related function (for example, a pedometer or tapping), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by a user or information provided to the user. The display unit 806 may include the display panel 8061. The display panel 8061 may be configured in a form of a liquid crystal display (LCD), an organic light-emitting diode (OLED), or the like.

The user input unit 807 may be configured to receive the input digit or character information, and generate a key signal input related to user settings and function control of the terminal. Specifically, the user input unit 807 includes a touch panel 8071 and other input devices 8072. The touch panel 8071 is also referred to as a touch screen and may collect a touch operation of a user on or near the touch panel 8071 (for example, the operation of the user on or near the touch panel 8071 by using a finger, a touch pen, or any other proper object or accessory). The touch panel 8071 may include two parts: a touch detection apparatus and a touch controller. The touch detection apparatus detects a touch orientation of a user, detects a signal brought by the touch operation, and transmits the signal to the touch controller. The touch controller receives touch information from the touch detection apparatus, converts the touch information into touch point coordinates, transmits the touch point coordinates to the processor 810, and receives and executes a command transmitted by the processor 810. In addition, the touch panel 8071 may be implemented in a plurality of forms, for example, as a resistive, capacitive, infrared, or surface acoustic wave touch panel. In addition to the touch panel 8071, the user input unit 807 may further include the other input devices 8072. Specifically, the other input devices 8072 may include but are not limited to a physical keyboard, a function key (for example, a volume control key and an on/off key), a trackball, a mouse and a joystick. Details are not described herein.

Further, the touch panel 8071 may cover the display panel 8061. After detecting a touch operation on or near the touch panel 8071, the touch panel 8071 transmits the touch operation to the processor 810 to determine a type of a touch event. Then, the processor 810 provides a corresponding visual output on the display panel 8061 based on the type of the touch event. In FIG. 7, the touch panel 8071 and the display panel 8061 serve as two separate components to implement input and output functions of the terminal. However, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headphone port, an external power (or battery charger) port, a wired or wireless data port, a memory card port, a port for connecting an apparatus that has an identification module, an audio input/output (I/O) port, a video I/O port, an earphone port, and the like. The interface unit 808 may be configured to receive an input (for example, data information or power) from the external apparatus and transmit the received input to one or more elements in the terminal 800, or may be configured to transmit data between the terminal 800 and the external apparatus.

The memory 809 may be configured to store a software program and various data. The memory 809 may substantially include a program storage region and a data storage region. The program storage region may store an operating system, an application program required for at least one function (for example, a sound play function and an image play function), and the like. The data storage region may store data (for example, audio data and a phone book) created based on use of a mobile phone, and the like. In addition, the memory 809 may include a high-speed random access memory, and may further include a non-volatile memory, for example, at least one disk storage device, a flash memory device, or other volatile solid-state storage devices.

The processor 810 is a control center of the terminal, and is connected to all parts of the entire terminal by using various interfaces and lines. The processor 810 performs various functions of the terminal and processes data by running or executing software programs and modules stored in the memory 809 and calling data stored in the memory 809, so as to perform overall monitoring on the terminal. The processor 810 may include one or more processing units. Preferably, the processor 810 may integrate an application processor and a modem processor. The application processor substantially processes an operating system, a user interface, an application program, and the like. The modem processor substantially processes wireless communication. It may be understood that the modem processor may alternatively not be integrated into the processor 810.

The terminal 800 may further include a power supply 811 (for example, a battery) that supplies power to the components. Preferably, the power supply 811 may be logically connected to the processor 810 by using a power management system, so as to implement functions such as charge management, discharge management, and power consumption management by using the power management system.

In addition, the terminal 800 includes some functional modules that are not shown. Details are not described herein.

Preferably, an embodiment of the present invention further provides a terminal, including the processor 810, the memory 809, and a computer program stored in the memory 809 and capable of running on the processor 810. When the computer program is executed by the processor 810, the processes of the foregoing capability parameter determining method embodiments are implemented, and the same technical effects can be implemented. To avoid repetition, details are not described herein again.

It should be noted that, in this embodiment, the terminal 800 may be a terminal in any implementation of the method embodiments of the present invention, and any implementation of the terminal in the method embodiments of the present invention may be implemented by the terminal 800 in this embodiment, with the same beneficial effects achieved. Details are not described herein again.

Figure 8:
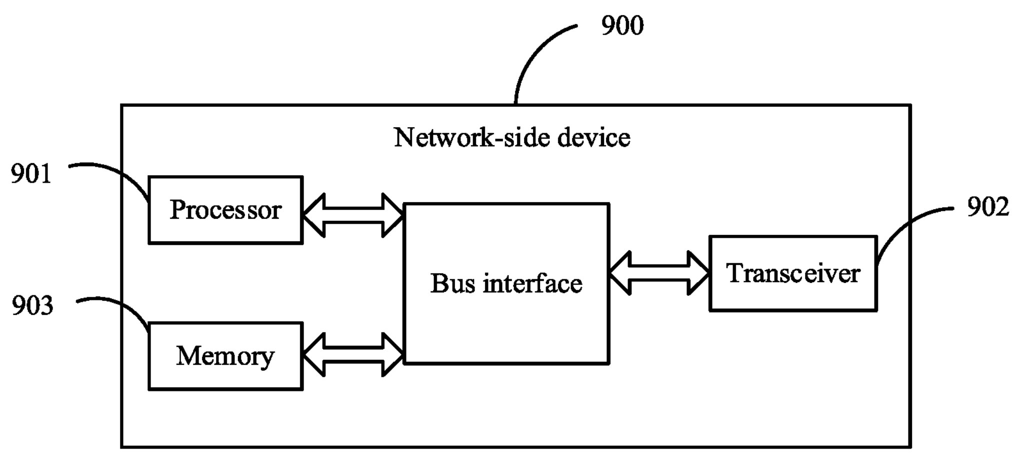
FIG. 8 is a schematic diagram of a hardware structure of a network-side device according to an embodiment of the present invention.

FIG. 8 is a structural diagram of a network-side device according to an embodiment of the present invention. As shown in FIG. 8, the network-side device 900 includes: a processor 901, a transceiver 902, a memory 903, and a bus interface.

The transceiver 902 is configured to:

perform, based on a first maximum uplink duty cycle and a second maximum uplink duty cycle of a terminal, uplink scheduling for the terminal on a first link and a second link respectively;

where the first link is a frequency division duplex FDD link, the first maximum uplink duty cycle is a capability parameter of the terminal on the first link, and the first maximum uplink duty cycle is a predetermined capability parameter; and the second maximum uplink duty cycle is a capability parameter of the terminal on the second link.

Optionally, the transceiver 902 is further configured to: receive the second maximum uplink duty cycle reported by the terminal.

In the embodiments of the present invention, for a dual connectivity terminal with an FDD link, the maximum uplink duty cycle of the FDD link is predefined. In this way, because the maximum uplink duty cycle of the FDD link has been determined, the maximum uplink duty cycle of the other link can also be determined in the uplink dual connectivity scenario. Therefore, reference can be provided for the network-side device to perform uplink scheduling behaviors, helping improve communication performance in the uplink dual connectivity scenario. The capability parameter determining method provided in the embodiments of the present invention is simple and feasible, and is applicable to various scenarios that require an uplink dual connectivity high-power terminal, for example, ENDC with an FDD link, uplink carrier aggregation, and SUL.

In FIG. 8, a bus architecture may include any quantity of interconnected buses and bridges, and specifically interconnect various circuits of one or more processors represented by the processor 901 and a memory represented by the memory 903. The bus architecture may further interconnect various other circuits of a peripheral device, a voltage regulator, a power management circuit, and the like. These are commonly known in the art and therefore are not further described in this specification. The bus interface provides an interface. The transceiver 902 may include a plurality of components, including a transmitter and a receiver, and provides a unit for communicating with various other apparatuses on a transmission medium. For a different terminal, a user interface 904 may alternatively be an interface that can be externally or internally connected to a required device. The connected device includes but is not limited to a small keyboard, a display, a loudspeaker, a microphone, a joystick, and the like.

The processor 901 is responsible for management of the bus architecture and general processing, and the memory 903 may store data for use by the processor 901 when the processor 901 performs an operation.

It should be noted that, in this embodiment, the network-side device 900 may be a network-side device in any implementation of the method embodiments of the present invention, and any implementation of the network-side device in the method embodiments of the present invention may be implemented by the network-side device 900 in this embodiment, with the same beneficial effects achieved. Details are not described herein.

An embodiment of the present invention further provides a computer-readable storage medium. The computer-readable storage medium stores a computer program, and when the computer program is executed by a processor, the processes of the foregoing embodiments corresponding to the terminal or the network-side device are implemented, and the same technical effects can be implemented. To avoid repetition, details are not described herein again. The computer-readable storage medium is a read-only memory (ROM), a random access memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by "includes a . . . " does not preclude the existence of other identical elements in the process, method, article, or apparatus that includes the element.

With the foregoing descriptions of the implementations, persons skilled in the art may clearly learn that the method in the foregoing embodiments may be implemented by hardware only, or may be implemented by software and necessary general-purpose hardware platforms, which is a preferable implementation in many cases. Based on this understanding, the essence or the part that contributes to the prior art in the technical solutions of the present invention can be embodied in the form of a software product. The computer software product is stored in a storage medium (for example, an ROM/RAM, a magnetic disk, or an optical disc), and includes a plurality of instructions for enabling a terminal (for example, a mobile phone, a computer, a server, an air conditioner, or a network device) to implement the method in all the embodiments of the present invention.

The foregoing descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A capability parameter determining method executed by a terminal, wherein a connection link of the terminal comprises a first link and a second link, the first link is a frequency division duplex FDD link, and the method comprises:

if an uplink duty cycle scheduled by a network-side device for the first link is less than or equal to a first maximum uplink duty cycle and an uplink duty cycle scheduled by the network-side device for the second link is less than or equal to a second maximum uplink duty cycle, performing, by the terminal, uplink transmission on the first link at a first transmit power and performing uplink transmission on the second link at a second transmit power;

wherein the first maximum uplink duty cycle is a capability parameter of the terminal on the first link, the first maximum uplink duty cycle is predefined; and the second maximum uplink duty cycle is a capability parameter of the terminal on the second link;

wherein the first maximum transmit power is a maximum transmit power of the terminal on the first link, and the second maximum transmit power is a maximum transmit power of the terminal on the second link;

wherein the first transmit power is less than or equal to the first maximum transmit power; and the second transmit power is less than or equal to the second maximum transmit power.

2. The method according to claim 1, wherein a sum of transmit powers of the terminal on the first link and the second link is less than or equal to a third maximum transmit power, wherein the third maximum transmission power is less than or equal to a sum of the first maximum transmit power and the second maximum transmit power.

3. The method according to claim 1, further comprising:

if the uplink duty cycle scheduled by the network-side device for the first link is greater than the first maximum uplink duty cycle or the uplink duty cycle scheduled by the network-side device for the second link is greater than the second maximum uplink duty cycle, performing, by the terminal, uplink transmission on the first link at a third transmit power and performing uplink transmission on the second link at a fourth transmit power;

wherein the third transmit power is less than the first maximum transmit power; and/or the fourth transmit power is less than the second maximum transmit power.

4. The method according to claim 1, wherein the first maximum uplink duty cycle is prescribed in a protocol.

5. The method according to claim 1, wherein the second link is an FDD link or a time division duplex TDD link.

6. The method according to claim 1, further comprising: determining, based on the first maximum uplink duty cycle, the second maximum uplink duty cycle of the terminal.

7. The method according to claim 6, wherein the determining, based on the first maximum uplink duty cycle, the second maximum uplink duty cycle of the terminal comprises:

determining, based on the first maximum uplink duty cycle, and a total radiation threshold, the second maximum uplink duty cycle of the terminal.

8. The method according to claim 6, wherein the capability parameters of the terminal on the first link are present in N groups, and each group of the capability parameters comprise one first maximum uplink duty cycle, wherein N is an integer greater than 1; and the determining, based on the first maximum uplink duty cycle, the second maximum uplink duty cycle of the terminal comprises:

determining, based on the first maximum uplink duty cycle in each group of the capability parameters, the second maximum uplink duty cycle of the terminal.

9. The method according to claim 6, wherein the method further comprises:

reporting the second maximum uplink duty cycle.

10. A network-side device, comprising: a memory, a processor, and a computer program stored in the memory and capable of running on the processor, wherein the computer program is executed by the processor to implement:

performing, based on a first maximum uplink duty cycle and a second maximum uplink duty cycle of a terminal, uplink scheduling for the terminal on a first link and a second link respectively;

wherein the first link is a frequency division duplex FDD link, the first maximum uplink duty cycle is a capability parameter of the terminal on the first link, and the first maximum uplink duty cycle is predetermined; and the second maximum uplink duty cycle is a capability parameter of the terminal on the second link;

wherein, if an uplink duty cycle scheduled by the network-side device for the first link is less than or equal to the first maximum uplink duty cycle and an uplink duty cycle scheduled by the network-side device for the second link is less than or equal to the second maximum uplink duty cycle, uplink transmission on the first link is performed at a first transmit power and uplink transmission on the second link is performed at a second transmit power;

wherein the first maximum transmit power is a maximum transmit power of the terminal on the first link, and the second maximum transmit power is a maximum transmit power of the terminal on the second link;

wherein the first transmit power is less than or equal to the first maximum transmit power; and the second transmit power is less than or equal to the second maximum transmit power.

11. The network-side device according to claim 10, wherein the computer program is further executed by the processor to implement:

receiving the second maximum uplink duty cycle reported by the terminal.

12. A terminal, comprising: a memory, a processor, and a computer program stored in the memory and capable of running on the processor, wherein a connection link of the terminal comprises a first link and a second link, the first link is a frequency division duplex FDD link, the computer program is executed by the processor to implement:

if an uplink duty cycle scheduled by a network-side device for the first link is less than or equal to a first maximum uplink duty cycle and an uplink duty cycle scheduled by the network-side device for the second link is less than or equal to a second maximum uplink duty cycle, performing uplink transmission on the first link at a first transmit power and performing uplink transmission on the second link at a second transmit power;

wherein the first maximum uplink duty cycle is a capability parameter of the terminal on the first link, the first maximum uplink duty cycle is predefined; and the second maximum uplink duty cycle is a capability parameter of the terminal on the second link;

wherein the first maximum transmit power is a maximum transmit power of the terminal on the first link, and the second maximum transmit power is a maximum transmit power of the terminal on the second link;

wherein the first transmit power is less than or equal to the first maximum transmit power; and the second transmit power is less than or equal to the second maximum transmit power.

13. The terminal according to claim 12, wherein a sum of transmit powers of the terminal on the first link and the second link is less than or equal to a third maximum transmit power, wherein the third maximum transmit power is less than or equal to a sum of the first maximum transmit power and the second maximum transmit power.

14. The terminal according to claim 12, wherein the computer program is further executed by the processor to implement:

if an uplink duty cycle scheduled by a network-side device for the first link is greater than the first maximum uplink duty cycle or an uplink duty cycle scheduled by the network-side device for the second link is greater than the second maximum uplink duty cycle, performing uplink transmission on the first link at a third transmit power and performing uplink transmission on the second link at a fourth transmit power;

wherein the third transmit power is less than the first maximum transmit power; and/or the fourth transmit power is less than the second maximum transmit power.

15. The terminal according to claim 12, wherein the first maximum uplink duty cycle is prescribed in a protocol.

16. The terminal according to claim 12, wherein the second link is an FDD link or a time division duplex TDD link.

17. The terminal according to claim 12, wherein the computer program is further executed by the processor to implement:

determining, based on the first maximum uplink duty cycle, the second maximum uplink duty cycle of the terminal.

18. The terminal according to claim 17, wherein the computer program is further executed by the processor to implement:

determining, based on the first maximum uplink duty cycle, and a total radiation threshold, the second maximum uplink duty cycle of the terminal.

19. The terminal according to claim 17, wherein the capability parameters of the terminal on the first link are present in N groups, and each group of the capability parameters comprise one first maximum uplink duty cycle, wherein Nis an integer greater than 1; and the computer program is further executed by the processor to implement:

determining, based on the first maximum uplink duty cycle in each group of the capability parameters, the second maximum uplink duty cycle of the terminal.

20. The terminal according to claim 17, wherein the computer program is further executed by the processor to implement:

reporting the second maximum uplink duty cycle.

* * * * *